United States Patent  (10) Patent No.: US 12,021,921 B2
Abdelrehim  (45) Date of Patent: Jun. 25, 2024

(54) DATA PLANE REDUCTION FOR EVENTING COMPONENTS

(71) Applicant: Red Hat, Inc., Raleigh, NC (US)

(72) Inventor: Ahmed Abdalla Ibrahim Abdelrehim, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 67 days.

(21) Appl. No.: 17/976,351

(22) Filed: Oct. 28, 2022

(65) Prior Publication Data

US 2024/0146800 A1 May 2, 2024

(51) Int. Cl.
*H04L 67/1001* (2022.01)
*H04L 41/12* (2022.01)
*H04L 67/53* (2022.01)

(52) U.S. Cl.
CPC .......... *H04L 67/1001* (2022.05); *H04L 41/12* (2013.01); *H04L 67/53* (2022.05)

(58) Field of Classification Search
CPC ...... H04L 67/1001; H04L 67/53; H04L 41/12
See application file for complete search history.

(56) References Cited

U.S. PATENT DOCUMENTS

| 8,874,788 B2 | 10/2014 | Vasseur et al. |
| 11,256,552 B1 | 2/2022 | Lam et al. |
| 2012/0155511 A1* | 6/2012 | Shaffer ................ H04B 1/7143 |
| | | 375/E1.033 |
| 2020/0374953 A1* | 11/2020 | Majmundar .......... H04W 92/20 |
| 2022/0121946 A1 | 4/2022 | Safnuk |

FOREIGN PATENT DOCUMENTS

| CN | 113254356 A | 8/2021 |
| CN | 114553970 A | 5/2022 |

OTHER PUBLICATIONS

Aitor Arjona et al., "Triggerflow: Trigger-based orchestration of serverless workflows", Future Generation Computer Systems, vol. 124, Nov. 2021.
"Verify Knative Eventing" Cloud Native Runtimes for VMware Tanzu, VMware Docs, Jun. 7, 2022.
Tyler Britten, "Using Knative Eventing for Better Observability" VMware Tanzu Developer Center, Feb. 22, 2021.

* cited by examiner

*Primary Examiner* — Minh Chau Nguyen
(74) *Attorney, Agent, or Firm* — Womble Bond Dickinson (US) LLP (57) ABSTRACT

Systems and methods are described for configuring a data plane of an event streaming platform. An example method includes receiving a topology definition describing a topology of an event streaming platform, and generating, based on the topology definition, a Directed Acyclical Graph (DAG) that represents a data plane of the event streaming platform. The method also includes generating, via a processing device, a simplified data plane pathway based on the DAG, wherein the simplified data plane pathway eliminates intermediate hops between an event source and a final event destination described by the topology definition.

20 Claims, 7 Drawing Sheets

DATA PLANE REDUCTION FOR EVENTING COMPONENTS

TECHNICAL FIELD

Aspects of the present disclosure relate to cloud computing systems, and more particularly, to a communication protocol implemented in a serverless computer cluster.

BACKGROUND

Serverless computing, often referred to as functions as a service, is a cloud computing model in which the cloud provider dynamically manages the allocation of the cloud system's computing resources for computing functions. A serverless computing system allows a developer to deploy code on the system, while handling the scaling, capacity planning and maintenance operations of running the code and hiding such operations from the developer. The deployed code may respond to events that originate from anywhere, including outside the system and the system handles the scaling/provisioning of resources to allow the code to respond to such events.

Knative is a software framework that adds components for deploying, running, and managing serverless applications to Kubernetes, which is a platform for managing containerized workloads and services. Apache Kafka is a popular open-source distributed event streaming platform. Distributed stream processing systems often involve the use of geographically distributed architectures for processing large data streams in real time to increase efficiency and reliability of the data ingestion, data processing, and the display of data for analysis. Knative supports various usecases for Kafka by offering various components that facilitate communication between Kafka components. Stream processing systems such as Kafka may be deployed in a variety of architectures including, for example, the Red Hat™ OpenShift™ platform built around Kubernetes.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Kubernetes is a container orchestration system for automating software development, scaling, and management. Kubernetes provides for the creation and management of a software containers in a distributed computer system that may span multiple computing systems which may be geographically remote. Each software container may operate as a member of a compute cluster and appear as an individual processing unit of the cluster.

Knative is a software architecture that can be integrated into a Kubernetes system to make some creation and management of users' workloads (e.g., event driven workloads) within the Kubernetes infrastructure more transparent to developers, thereby improving the ease of use. Knative allows serverless applications to be deployed and run on any Kubernetes platform, including Red Hat OpenShift Container Platform. Knative provides various software tools that enable programming and deployment of software to a Kubernetes cluster. For example, Knative includes services that enable communication between different types of Kafka components using the Knative Eventing specification. The Knative Eventing specification defines a set of common primitives that can be configured to support message ingressing, routing, and egressing. This enables users to compose event processing applications through configuration rather than application code.

In the Kafka architecture, data is stored as key-value messages in what are known as topics. Kafka can be configured to run on a cluster of multiple servers and topics can be replicated across multiple nodes of the cluster. This allows Kafka to be fault tolerant and to handle a large amount of message traffic. Communication between components of the Kafka architecture is based on a binary TCP protocol, which is highly efficient and uses the concept of a "record batch" to group messages together.

Knative eventing does not dictate a specific implementation technology for achieving the described functionality, instead it provides the specifications for a control plane contract and a data plane contract. The control plane contract describes the structure, lifecycle, and management the Knative eventing API resources. The Knative data plane contract defines the communication protocol and event format between event senders and event receivers. Knative eventing uses the CloudEvents specification as the data plane protocol between components. CloudEvent is an event specification developed by the Cloud Native Computing Foundation (CNCF) to provide a standardized process for communicating event information.

The Knative data plane contract dictates that all eventing components support HTTP bindings. HTTP is also used for Kafka components when they are wired together. Accordingly, Kafka messages traveling between the Kafka streaming platform and eventing components with an HTTP API undergo a translation process, which adds time and consumes processing resources.

Based on the contracts and abstractions defined by Knative Eventing, users can declaratively wire together logical eventing components configured to ingest and route events from the event's source to the event's destination. A typical setup with a small number of eventing components may introduce multiple unnecessary conversions between the Kafka binary protocol and HTTP CloudEvents over the journey of the event. Such back and forth conversions increase the end-to-end event delivery latency due to multiple serialization and deserialization operations as well as multiple data plane hops from source to destination. This increases the costs of resources such as storage, CPU, memory, and network bandwidth. Due to the high latency and event duplications, the chain of eventing components may be inefficient for multiple users and use cases.

The present disclosure describes techniques for improving an eventing data-plane configuration. Embodiments of the present techniques receive a set of logical constructs defining a chain of eventing component APIs. The resulting API chain of eventing components will have a series of data-plane hops that can be analyzed as a Directed Acyclical Graph (DAG) where a node (i.e., vertex) is any data-plane hop where the event gets serialized or deserialized. A set of paths may be extracted from the DAG and, for each path, a simplified path can be defined that includes the origination of the event and the destination of events, but skips the intermediate hops. In some embodiments, each path may be reduced to a single hop. Skipping the intermediate hops reduces the number of times that the event messages are serialized and deserialized and reduces the number of times that event messages are translated between protocols, e.g. between the binary Kafka protocol and HTTP. Thus, eliminating hops saves time and results in reduced resource utilization. Additionally, the latency of forwarding and receiving events is reduced. The techniques described herein may also result in reduced monetary cost to customers of the who are often charged based on network throughput.

Figure 1:
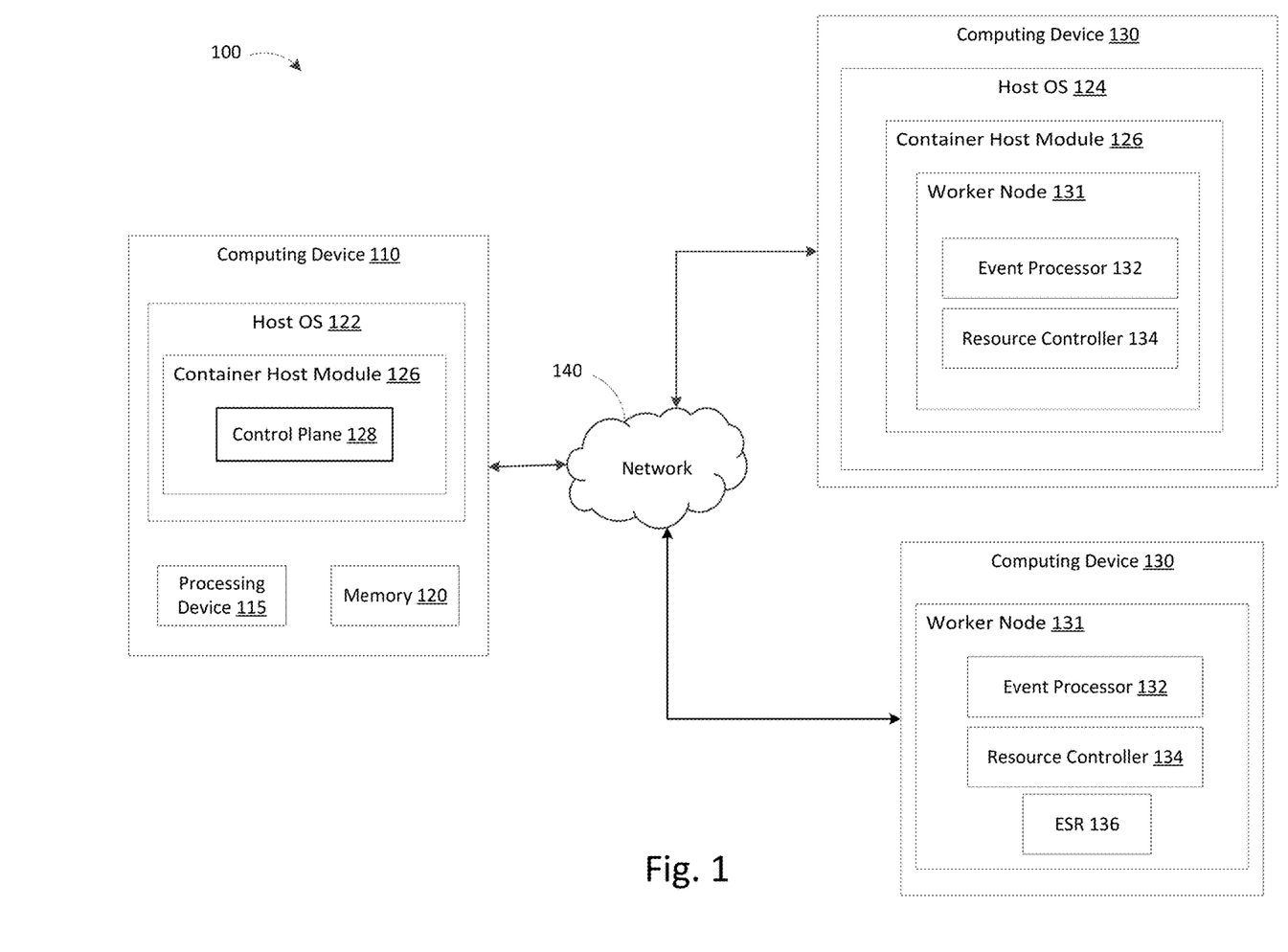
FIG. 1 is a block diagram that illustrates an example system in accordance with some embodiments of the present disclosure.

FIG. 1 is a block diagram that illustrates an example system in accordance with some embodiments of the present disclosure. As illustrated in FIG. 1, the system 100 includes a computing device 110, and a plurality of computing devices 130. The computing devices 110 and 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network.

The network 140 may carry communications (e.g., data, message, packets, frames, etc.) between computing device 110 and computing devices 130. Each computing device 110 and 130 may include hardware such as processing device 115 (e.g., processors, central processing units (CPUs)), memory 120 (e.g., random access memory (e.g., RAM)), storage devices (e.g., hard-disk drive (HDD), solid-state drive (SSD), etc.—not shown), and other hardware devices (e.g., sound card, video card, etc.—not shown). In some embodiments, memory 120 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 120 may be configured for long-term storage of data and may retain data between power on/off cycles of the computing device 110. Each computing device may comprise any suitable type of computing device or machine that has a programmable processor including, for example, server computers, desktop computers, laptop computers, tablet computers, smartphones, set-top boxes, etc. In some examples, each of the computing devices 110 and 130 may comprise a single machine or may include multiple interconnected machines (e.g., multiple servers configured in a cluster). The computing devices 110 and 130 may be implemented by a common entity/organization or may be implemented by different entities/organizations. For example, computing device 110 may be operated by a first company/corporation and one or more computing devices 130 may be operated by a second company/corporation.

Each of computing device 110 and computing devices 130 may execute or include an operating system (OS) such as host OS 122 and host OS 124 respectively, as discussed in more detail below. The host OS of a computing device 110 and 130 may manage the execution of other components (e.g., software, applications, etc.) and/or may manage access to the hardware (e.g., processors, memory, storage devices etc.) of the computing device. In some embodiments, computing device 110 may implement a control plane 128 (e.g., as part of a container orchestration engine) while computing devices 130 may each implement a worker node 131 (e.g., as part of the container orchestration engine).

In some embodiments, a container orchestration engine (referred to herein as container host 126), such as the Red Hat™ OpenShift™ module, may execute on the host OS 122 of computing device 110 and the host OS 124 of computing device 130, as discussed in further detail herein. The container host 126 may be a platform for developing and running containerized applications and may allow applications and the data centers that support them to expand from just a few machines and applications to thousands of machines that serve millions of clients. Container host 126 may provide an image-based deployment module for creating containers and may store one or more image files for creating container instances. Many application instances can be running in containers on a single host without visibility into each other's processes, files, network, and so on. Each container may provide a single function (often called a "micro-service") or component of an application, such as a web server or a database, though containers can be used for arbitrary workloads. In this way, the container host 126 provides a function-based architecture of smaller, decoupled units that work together.

By their nature, containerized applications are separated from the operating systems where they run and, by extension, their users. The control plane 128 may include a Kubernetes API server that exposes applications to internal and external networks by defining network policies that control communication with containerized applications (e.g., incoming HTTP or HTTPS requests for services inside the cluster). The core Kubernetes API server may also be extended by additional custom software definitions that may be provided by the user. For example, a background program referred to herein as a reconciler may be configured to leverage the Kubernetes API server to create, update, and delete cluster resources such as Kafka sources, Kafka channels, and others. The reconciler is configured to compare a desired state with actual state of the cluster, and if there is a difference then triggers changes to move the actual state to the configured state.

A typical deployment of the container host 126 may include a control plane 128 and a cluster of worker nodes 131, including worker nodes 131A and 131B (also referred to as compute machines). The control plane 128 may include representational state transfer (REST) APIs which expose objects as well as controllers which read those APIs, apply changes to objects, and report status or write back to objects. The control plane 128 manages workloads on the worker nodes 131 and executes services that are required to control the worker nodes 131.

The cluster of worker nodes 131 are where the actual workloads requested by users run and are managed. The worker nodes 131 advertise their capacity and a scheduler (not shown), which is part of the control plane 128, determines which worker nodes 131 containers and pods will be started on. Each worker node 131 includes functionality to accept and fulfill requests for running and stopping container workloads, and a service proxy, which manages communication for pods across worker nodes 131. A worker node 131 may be implemented as a virtual server, logical container, for example.

Some or all of the worker nodes 131 may include one or more event processors 132 configured to send and/or receive CloudEvent messages. There may be various types of events processors 132, including event senders, event recipients, event sources, and event sinks. Event Senders initiate an HTTP POST to deliver a CloudEvent. Event Recipients receive an HTTP POST and accept (or reject) a CloudEvent. Event Sources are exclusively event senders, and never act as recipients. Event Sinks are exclusively event recipients, and do not send events as part of their event handling. Event Processors can be event senders, event recipients, or both. A chain of event communications may involve several event processors of various types, some of which may be Kafka components.

Each instantiated event processor 132 may be associated with a resource controller 134 that monitors the event processor 132 and reconciles the status of the event processor 132 according to the provided resource definition. The resource controller 134 can perform multiple tasks such as configure the data plane service with the access information it needs to route event messages between the event processors 132.

Some event processors 132 may be associated with an event storage and retrieval (ESR) system 136 for storing the event messages. The ESR system 136 may be any suitable system capable of storing event messages and facilitating the retrieval of event messages, including a file system, database, or a message broker such as RabbitMQ. In some embodiments, one or more of the event processors 132 may be Kafka-based processors, and the ESR system 136 may be a data streaming platform such as Apache Kafka™. The resource controller 134 can configure the data plane service with the access information it needs to connect and read from an event storage and retrieval (ESR) system such as a Kafka cluster (e.g. URLs, credentials, topic names, etc).

The Knative Eventing API provides a set of primitives that support ingressing, routing and egressing of events. If we take a specific ESR system such as Kafka as an example then the Knative components that use this ESR system may include a source, a broker, a channel, and a sink, each of which may be configured to use the ESR system 136 to store and retrieve events. Events may be stored in a specific ESR system in its corresponding native format. Some components involved in a chain of event communication may be based on a different ESR system, such as when an event is received or sent to a component outside of the native infrastructure.

The Knative Source is a component that is configured to send CloudEvents to a certain subscriber via HTTP. The events might be stored in a ESR system, in which case the Source is configured to read events from the ESR system. The Knative Source may convert events read from the ESR system to a message referred to as a Cloud event. Cloud events are event messages formatted according to the Cloud-Events specification and may be sent to a receiving component via different protocol bindings (the Knative specifications require HTTP bindings at the minimum).

A Knative sink is an addressable or a callable resource that can receive incoming Cloud events from other resources over HTTP. In some examples, the Knative sink may store them into an ESR system. For example, a Kafka sink stores received messages to a topic in a Kafka cluster.

The Knative channel is an event processor for providing an asynchronous fan-out queue that conforms to the Knative Eventing Channel specifications. The Knative channel is an addressable or callable resource that receives incoming events, stores them to an ESR system and then delivers any received events to one or more destinations through a subscription API. In accordance with the subscription API, any consumers that subscribe to the specific channel will receive any events that are received at the channel.

The Knative broker is an event processor that providing an asynchronous content-based routing that conforms to Knative Eventing Broker specification. The Knative broker is an addressable resource that receives incoming events, stores them to the ESR system 136, and then delivers any received events to one or more destinations through a trigger API. In accordance with the trigger API, the broker applies a filter for each of the consumers connected to the broker. The filter indicates the type of events that the consumer is configured to receive, and only events that satisfy the filter criteria are forwarded to the consumer.

The sources, brokers, channels, and sinks may be implemented as "Kubernetes native" APIs and can be configured to run as pods, software deployments, or micro-services inside of Kubernetes, depending on the design details of a particular implementation. The event processors 132 may be defined and configured by the user. For example, the user may generate a configuration file, such as a YAML file, that describes a resource definition, which can include a resource type, and a destination address for sending event messages, among other information.

Knative brokers, channels, and sinks can act as event recipients and are addressable resources that expose a resource address (HTTP URL) in their status. The URL is used as a destination for delivery of events to the resource. Accordingly, event processors 132 capable of receiving event messages include an HTTP ingress service for receiving HTTP messages directed to specific topics, and event processors 132 capable of sending event messages include an HTTP dispatch service for preparing HTTP messages to be delivered. The HTTP dispatch service and HTTP ingress service may be deployed as a container or pod that exposes a service for sending or receiving network traffic to facilitate communication between containers. Messages passed between nodes may be formatted as events using an event specification such as CloudEvent.

Addressable Resources expose a resource address (HTTP URL) in their status object. The exposed URL implements the data plane contract for receiving events and is used by other components as a destination for delivery of events to the resource. The Destination fragment is an interface (resource fragment) which is used consistently through Knative Eventing to reference an event delivery destination. A Destination fragment eventually resolves the supplied information to a URL and may be an absolute URL or relative to an Addressable object reference. In some cases, the Destination fragment also supports a Kubernetes Service object reference. An absolute URL in a Destination fragment may be used to reference cluster-external resources such as a virtual machine or a SaaS service. An ingress endpoint is an addressable endpoint exposed by an event processor that accepts CloudEvents for a possible asynchronous delivery to one or more destinations.

Figure 2:
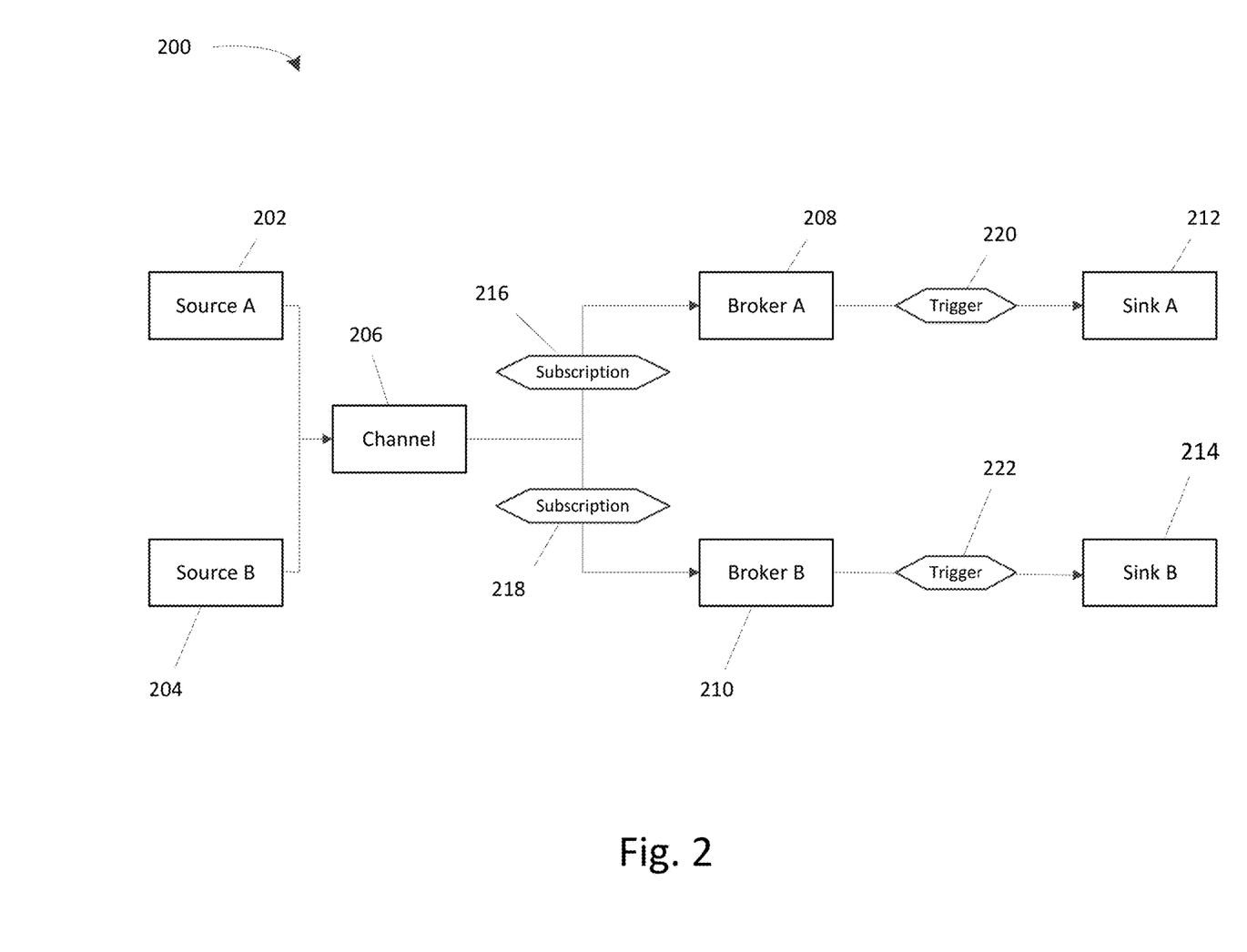
FIG. 2 is a functional block diagram illustrating a logical topology of eventing components configured to ingest and route events in accordance with some embodiments of the present disclosure.

FIG. 2 is a functional block diagram illustrating a logical topology of eventing components configured to ingest and route events in accordance with some embodiments of the present disclosure. The block diagram 200 of FIG. 2 shows the full communication path between a pair of sources 202 and 204 and two different types of receivers, a native sink 212, and a non-native sink 214. The native sink is a sink that is part of the infrastructure defined and controlled by the user of the system. The non-native sink is a sink that belongs to another service and is not part of the native system defined by the user. The logical connections shown in FIG. 2 that are part of the native system may be configured by the user based on the contracts and abstractions defined by the Knative Eventing specification to control how events are generated, routed, and consumed.

In this embodiment, the eventing components include two sources (source A 202 and source B 204), a channel 206, two brokers (broker A 208 and broker B 210) and two sinks (Sink A 212 and Sink B 214). Each of the depicted components may be implemented as software running in the Kubernetes cluster of FIG. 1 and may be implemented in one or more worker nodes 131. However, it will be appreciated that not all of the components are necessarily operating within the same computing cluster and at least some of the components may not be Kafka components.

Source A 202 and Source B 204 are event sources and can generate CloudEvents messages that are distributed via the channel 206. The source A 202 and source B 204 may be Kafka sources that read the events from one or more Kafka topics. The channel 206 may be a Kafka channel that routes events to broker A 208 in response to the subscription 216 and/or to broker B in accordance with subscription 218.

Broker A 208 and broker B 210 may be Kafka brokers. Broker A 208 is configured to route selected events to sink A 212 responsive to a filter applied by trigger 220, and Broker B 210 is configured to route selected events to sink B 214 responsive to a filter applied by trigger 222. Sink A 212 and sink B 214 may be Kafka sinks that store the events to a Kafka cluster or may be applications external to the Kafka system configured to consume the events.

The logical topology of eventing components may be configured by a user through a set of configuration files. For example, the user may define the characteristics of each of the components using a YAML file, which may be provided to the control plane 128, e.g., the Kubernetes API server, which reads the files and instantiates and configures the components to be compliant with the CloudEvents specification as described in relation to FIG. 1. A data plane configuration for the topology of FIG. 2 is shown in FIG. 3.

Figure 3:
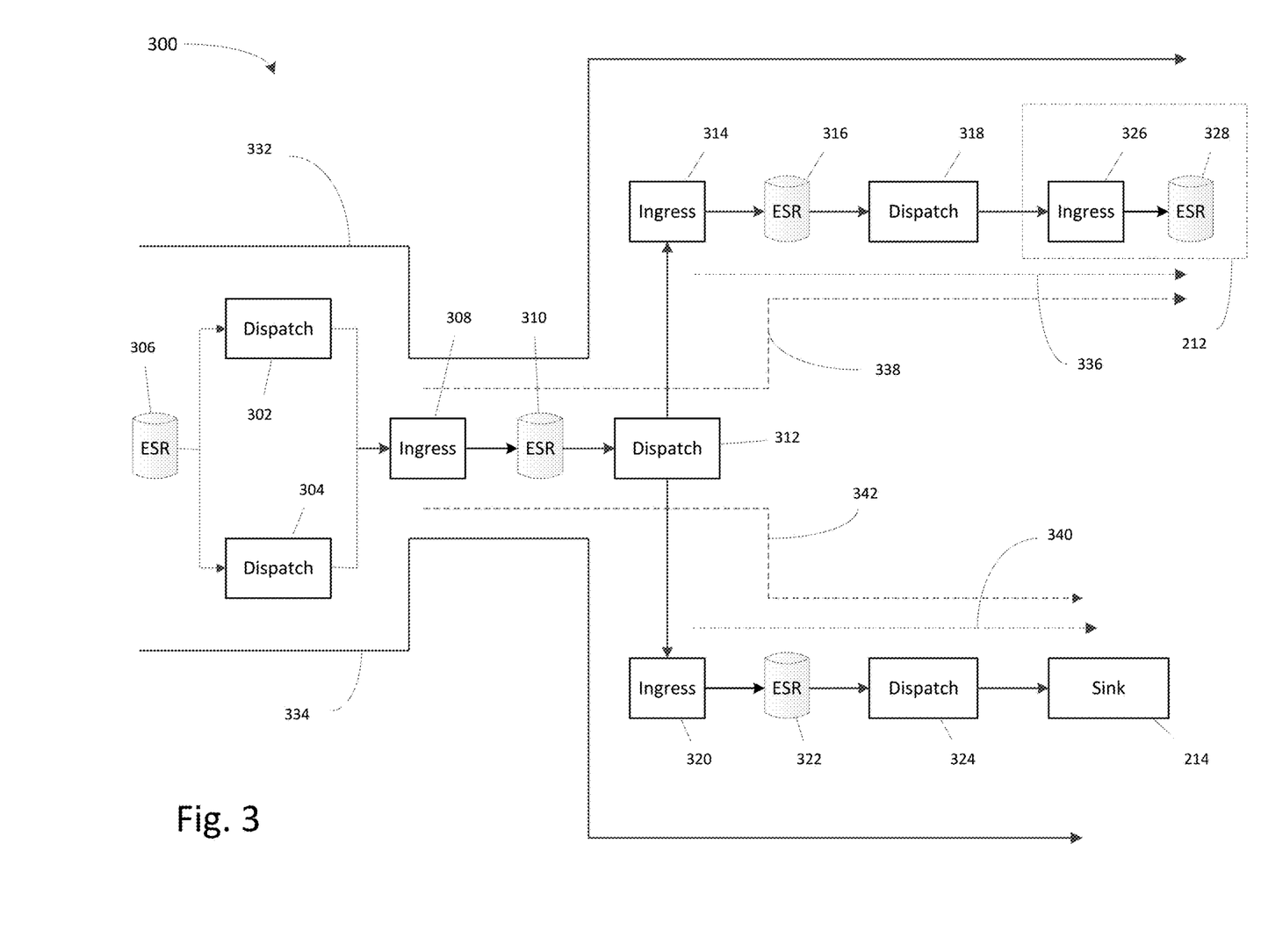
FIG. 3 is a data plane representation of the topology shown in FIG. 2 in accordance with some embodiments of the present disclosure.

FIG. 3 is a data plane representation of the topology shown in FIG. 2 in accordance with some embodiments of the present disclosure. The data plane 300 may be configured by the control plane 128 based on the configuration files or instructions received from the user. The data plane may be generated to be compliant with the CloudEvents protocol. In describing components of the data plane, reference will also be made to the components of FIG. 2.

Source A 202 may include a dispatch service 302 and Source B 204 may include a dispatch service 304. Both dispatch services 302 and 304 may be coupled to a common ESP 306 from which events can be read. The ESP 306 may be a Kafka cluster, and the dispatch services 302 and 304 may be Kafka dispatch services configured to read data, in the form of records, from the topics stored to a Kafka cluster. Although a single ESP is shown, in some embodiments the sources 202 and 204 may be associated with or coupled to a different ESPs.

The dispatch services 302 and 304 are configured to package the data in the form of a message and send the message to a specified destination (in this case, channel 206). As stated above, the Knative specification dictates that the CloudEvent messages can be sent and received using the HTTP protocol. Accordingly, the dispatchers 302 and 304 may be HTTP dispatchers configured to generated CloudEvents and send them via HTTP. The CloudEvent messages may be generated in accordance with an "egress contract." The egress contract resides in the sender (e.g., source, broker, or channel) and specifies one or more referenced components (e.g., sinks) that are to receive a specific message. For example, the egress contract can identify an HTTP address, URL, IRU, or IP address of a component that is to receive the message. Additionally, if the receiver is a Kafka component, the egress contract may also specify topic information of the referenced component, such as the URL of the Kafka broker, the topic name, and credentials. Information for populating the egress contract may be determined based on information received from the reconciler, which is described above in relation to FIG. 1.

The channel 206 includes an ingress 308 (e.g., HTTP ingress service) for receiving event messages, ESR 310 (e.g., Kafka ESR), and dispatch service 312. The ingress 308 processes the received event message and delivers the data payload to the ESR 310, thereby creating a replica of the message. In Kafka-based systems, processing the received event message may include converting the CloudEvent metadata into the Kafka binary protocol before storing the record to the ESR 310. The ingress 308 may also deliver an acknowledgment to the originating dispatch service 302 or 304 to indicate that the message was received. If an acknowledgement is not received, the dispatch service 302 or 304 may retry the message until an acknowledgement is received or until a specified number retries have been attempted.

Broker A 208 includes ingress service 314, ESR 316, and dispatch service 318. Broker B includes ingress service 320, ESR 322, and dispatch service 324. These services operate in the same or similar manner as ingress services 308, ESR 310, and dispatch service 312 except that they have different HTTP addressed and are configured to route event messages to different destinations using different rules. In this example, the dispatch service 318 sends HTTP CloudEvents messages to Sink A 212, which is a native component that includes an HTTP ingress service 326 and an ESR 328, and the dispatch service 324 sends HTTP CloudEvents messages to Sink B 214, which is non-native event consumer. For example, the sink B 214 may be an application that resides in the same computing cluster or a different computer system accessible through a network such as the Internet. In some embodiments, the sink B 214 may be a Knative service. However, other applications are possible.

As can be seen from FIG. 3, there are two main pathways through the topology. The first pathway 332 leads from the dispatch service 302 to the ESR 328, and the second pathway leads from the dispatch service 304 to the ESR 330. Additionally, each ingress service is capable of being a destination point for event messages from other sources (not shown) accordingly, there are also additional data plane pathways, 336, 338, 340, and 342.

The routing event messages involves several processes that are to be performed by each event processor. As stated above, one or more of the ESR systems may be Kafka based ESR systems. Each time the event is retrieved from a Kafka ESR (306, 310, 316, or 322), the corresponding dispatch service (302, 304, 312, 318, or 324) convert (e.g., deserializes) the Kafka record from the wire protocol. In some cases, if the Kafka record is not already formatted as a cloud event, the Kafak ESR system may also convert the deserialized record into a CloudEvent. The Kafka ESR system then transfers the CloudEvent to the destination ingress service (308, 314, 320, or 326) over HTTP which involves a conversion (serialization) from an HTTP request into the wire protocol. Each time a CloudEvent message is received at an ingress service, an HTTP request is extracted (e.g., deserialized) from the wire protocol, a Cloud Event is then extracted from the request, converted into a Kafka record, then converted (serialized) to the binary Kafka wire protocol and sent to a Kafka ESR system for storing the event as a Kafka record. It can be appreciated that this involves a significant processing overhead.

To simply the data plane pathways, the data plane topology may be analyzed to generate a DAG representation of the data plane topology. The DAG may be generated by treating each dispatch service and each ingress service as a node in the DAG. Intermediate hops between the source and the sink may then be eliminated to generate a set of simplified data plane pathways, as shown in FIGS. 4A and 4B.

Figure 4A:
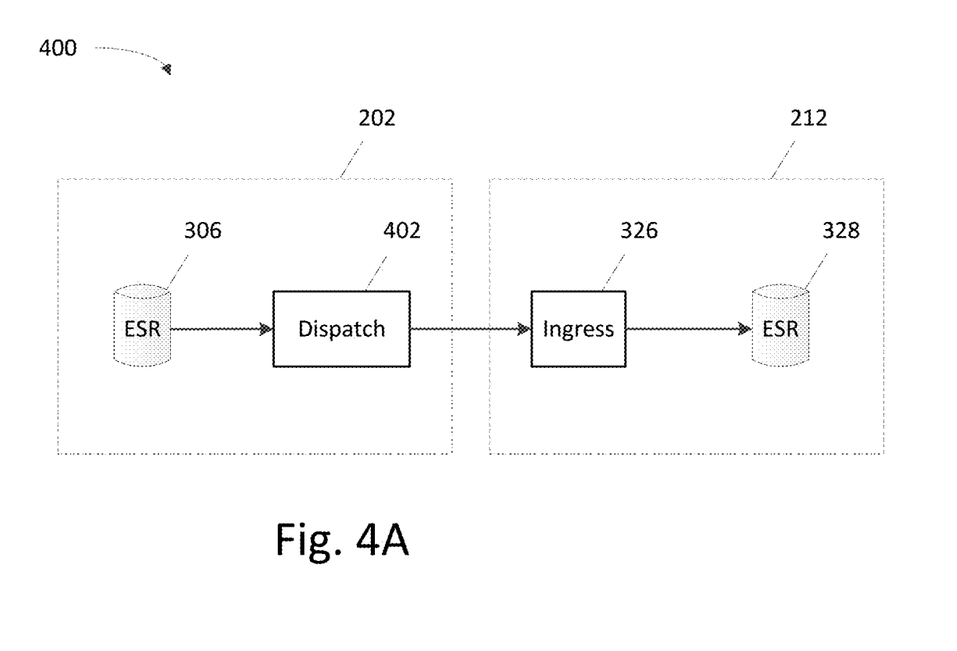
FIG. 4A is a block diagram of a simplified data plane pathway connecting a source to an internal sink in accordance with some embodiments of the present disclosure.

FIG. 4A is a block diagram of a simplified data plane pathway connecting a source to a native sink in accordance with some embodiments of the present disclosure. As shown in FIG. 4A, the ESR system 306 and the dispatch service 402 are part of the source (source A) 202, and the ingress service 326 and the ESR system 328 are part of the sink (sink A) 212. The dispatch service 402 is configured to address the ingress service 326 of the sink (sink A) 212 to send Cloud-Events directly to the sink A 212 without the intermediate hops. Additionally, the dispatch service 402 is configured to apply the event filter (e.g., trigger 220) that would otherwise be performed by Broker A 208 (FIG. 2), ensuring that the Sink A 212 receives the appropriate events meant for Sink A 212. In this way, the data plane pathway 332 shown in FIG. 3 is reduced to a single hop, thereby saving the additional processing resources involved in those intermediate hops.

Figure 4B:
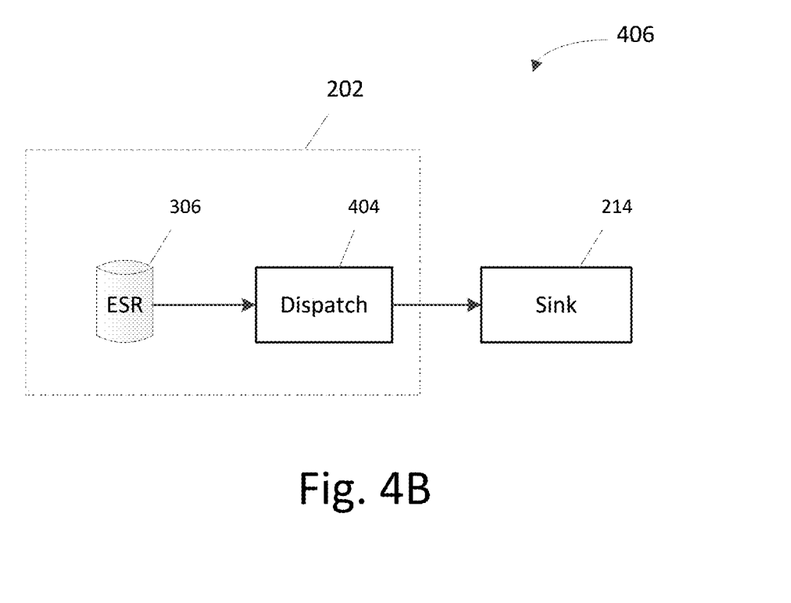
FIG. 4B is a block diagram of a simplified data plane pathway connecting a source to an external sink in accordance with some embodiments of the present disclosure.

FIG. 4B is a block diagram of a simplified data plane pathway connecting a source to a non-native sink in accordance with some embodiments of the present disclosure. As shown in FIG. 4B, the ESR system 306 and the dispatch service 404 are part of the source (source B) 204, and the sink (sink B) 214 is the non-native sink shown in FIG. 2. The dispatch service 404 is configured to address sink B 214 to send CloudEvents directly to the sink B 214 without the intermediate hops. Additionally, the dispatch service 404 is configured to apply the event filter (e.g., trigger 222) that would otherwise be performed by Broker B 210 (FIG. 2), ensuring that the Sink B 214 receives the appropriate events meant for Sink B 214. In this way, the data pathway 334 shown in FIG. 3 is reduced to a single hop, thereby saving the additional processing resources involved in those intermediate hops.

Although not shown, similar data plane pathways may be configured to account for the additional pathways 336, 338, 340, and 342 shown in FIG. 3. The simplified data plane pathways may be reconfigured each time a path is updated by the user. For example, the user may configure a new trigger for one of the brokers 208 210. In this case, since the simplified data plane pathway does not involve the broker, the relevant trigger information is used to reconfigure the dispatch service of the relevant source, which is reconfigurable if the entire path belongs to a single eventing project.

In some embodiments, the user may be able to specify whether simplified data plane pathways are to be generated for a given topology. For example, there may be instances when the user prefers the original topology as explicitly defined. This may be the case, for example, when the user expects to have replicas of the event messages stored to each of the ESR systems along the original data plane pathway (e.g., ESR system 310 and 316 for pathway 332). Using the simplified data plane pathway shown in FIG. 4A would cause the ESR systems 310 and 316 to be skipped over, which may not be expected or desired by the user depending on the project goals. In some embodiments, the user may specify the use of simplified or unsimplified data plane pathways for a particular namespace.

Adding the above improvements for simplifying the data plane pathways for a given topology will reduce latency and reduce bandwidth consumption, since the extra hops for delivering messages to the involved components can be safely skipped. At the same time, the components are still conformant to the Knative specification since the existing support for HTTP remains supported for all components.

Figure 5:
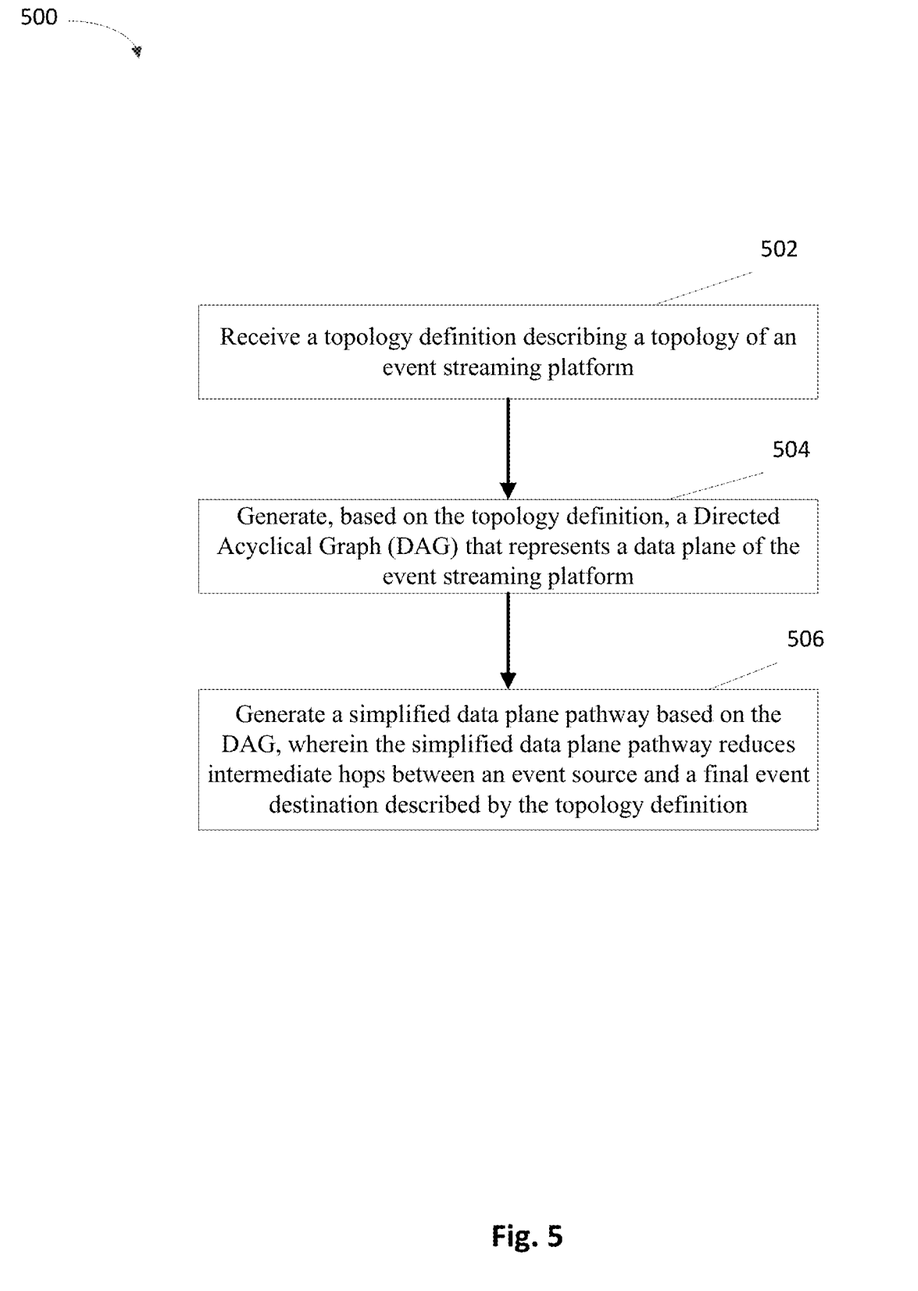
FIG. 5 is a process flow diagram of a method of sending messages from an event processing component in accordance with some embodiments of the present disclosure.

FIG. 5 is a process flow diagram of a method 500 of sending event massages from an event processor in accordance with some embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a cloud computing platform or a computer cluster comprising a plurality of work nodes. The method may begin at block 502.

At block 502, a topology definition describing a topology of an event streaming platform is received. The event streaming platform may be implemented at least partially in as a Kafka platform governed by the Knative eventing specification and may be implemented at least partially in a computing cluster such as a Kubernetes cluster. The topology definition may be received from a user a set of one or more configuration files (e.g., YAML files) that describe and determine the configuration of various components of the event streaming platform such as event sources, brokers, channels, and sinks. The configuration files may be received by the Kubernetes API server, which is configured to instantiate the components of the defined topology.

At block 504, a Directed Acyclical Graph (DAG) is generated based on the topology. The DAG represents a data plane of the event streaming platform defined by the topology. To generate the DAG each ingress service and each dispatch service included in the data plane is represented as a node of the DAG.

At block 506, a simplified data plane pathway is generated based on the DAG, wherein the simplified data plane pathway reduces intermediate hops between an event source and a final event destination described by the topology definition. The data plane pathway may be one of a set of data plane pathways generated for the topology. The set of simplified data plane pathways may include a simplified data plane pathway for each ingress service of the topology definition. At least some of the simplified data plane pathways eliminate at least one intermediate hop through the data plane. In some embodiments, each of the simplified data plane pathways includes a single hop from an event source to a final destination of the event. The event source in the simplified data plane pathway can include a dispatch service that is configure to route events messaged to the final destination as determined by the topology of the event streaming platform. The event messages generated by the dispatch service may be formatted as CloudEvents and packaged in an HTTP format. If the original topology includes a broker in the pathway between the source and the final destination, the event filter defined for the broker may be implemented at the event source.

Generating the simplified data plane pathways causes the components of the event streaming platform to be configured for generating, ingressing, and egressing event messages. The event messages may be a record of any suitable type of event data, including sporting event data, stock market data, news, weather, measured data such as temperature data, among others. In response to generating or receiving an event, the component's dispatch service generates an event message (e.g., HTTP CloudEvent message) and sends the event message to the configured destination according to the simplified data plane pathway. In some embodiments, the dispatch service sends the message directly to the final destination in a single hop, bypassing any intermediate hops that may be included in the topology definition.

Block 502 to 506 may be repeated each time the topology of the event streaming platform is updated. For example, if the user updates the trigger associated with a broker, or specifies a new subscription for a channel, block 502 to 506 may be repeated to generate a new set of simplified data plane pathways that accord with the new topology definition provided by the user.

Figure 6:
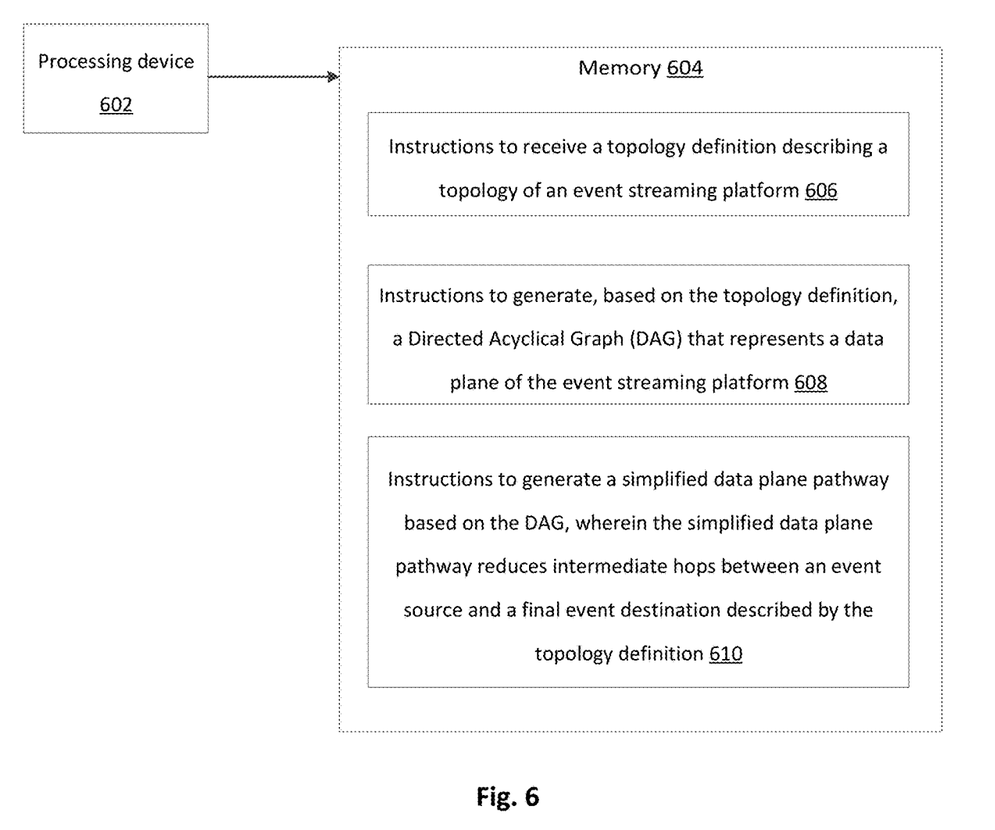
FIG. 6 is a block diagram of a system for configuring a data plane of an event streaming platform, in accordance with some embodiments of the present disclosure.

FIG. 6 is a block diagram of a system for configuring a data plane of an event streaming platform, in accordance with some embodiments of the present disclosure. The system 600 includes a processing device 602 operatively coupled to a memory 604. The memory 604 includes instructions that are executable by the processing device 602 to cause the processing device 602 to configure a data plane of an event streaming platform.

The memory 604 includes instructions 606 to receive a topology definition describing a topology of an event streaming platform. The memory 604 includes instructions 608 to generate, based on the topology definition, a Directed Acyclical Graph (DAG) that represents a data plane of the event streaming platform. The memory 604 includes instructions 610 to generate a simplified data plane pathway based on the DAG, wherein the simplified data plane pathway reduces intermediate hops between an event source and a final event destination described by the topology definition.

It will be appreciated that various alterations may be made to the process illustrated in FIG. 6 and that some components and processes may be omitted or added without departing from the scope of the disclosure.

Figure 7:
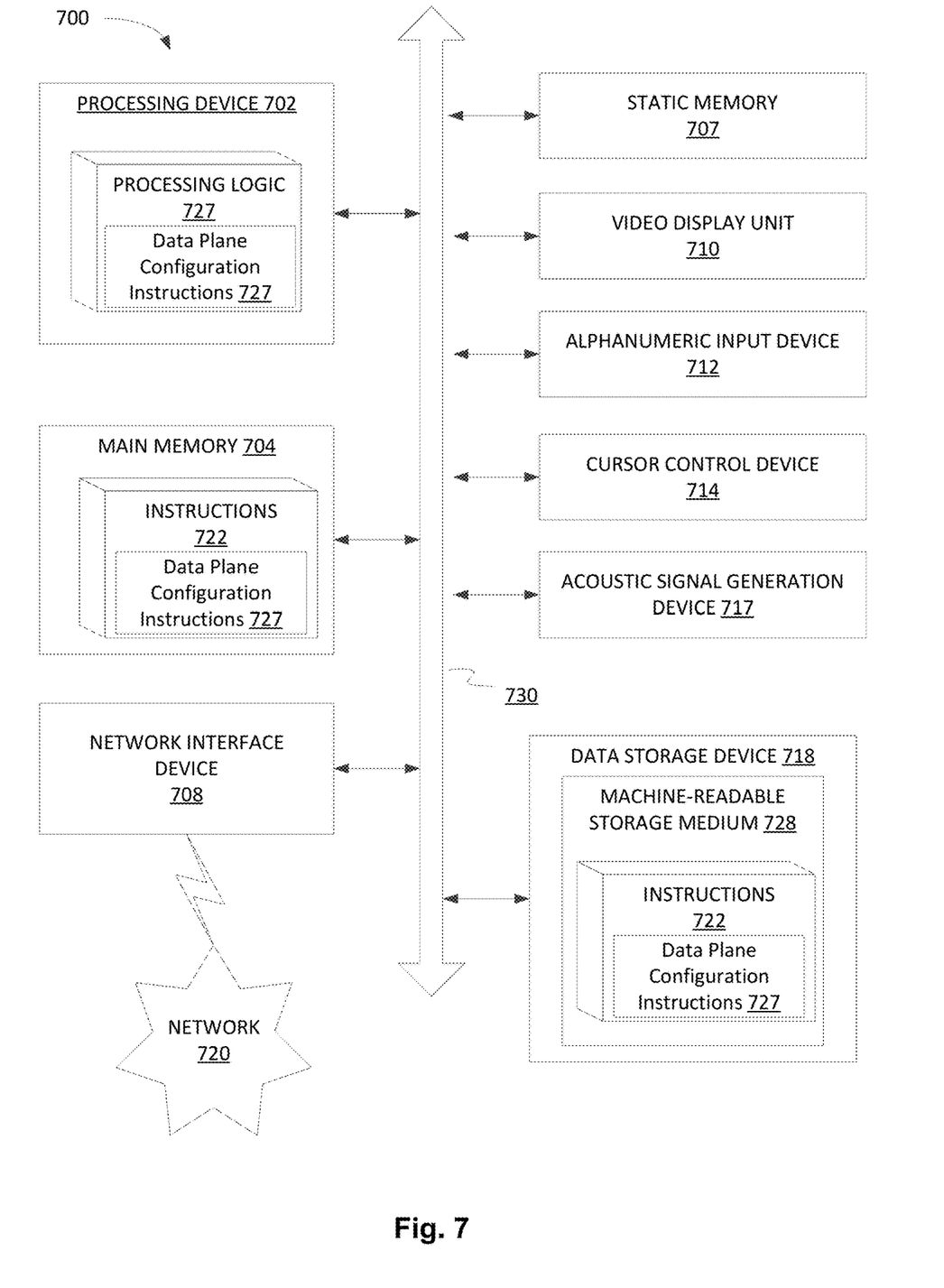
FIG. 7 is a block diagram of an example computing device that may perform one or more of the operations described herein, in accordance with some embodiments of the present disclosure.

FIG. 7 illustrates a diagrammatic representation of a machine in the example form of a computer system 700 within which a set of instructions, for causing the machine to perform any one or more of the methodologies discussed herein for configuring a data plane of an event streaming platform and/or transferring event messages between components in a event streaming platform. The machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a web appliance, a server, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute data plane configuration instructions 725, for performing the operations and steps discussed herein.

The data storage device 718 may include a machine-readable storage medium 728, on which is stored one or more sets of data plane configuration instructions 725 (e.g., software) embodying any one or more of the methodologies of functions described herein. The data plane configuration instructions 725 may also reside, completely or at least partially, within the main memory 704 or within the processing device 702 during execution thereof by the computer system 700; the main memory 704 and the processing device 702 also constituting machine-readable storage media. The data plane configuration instructions 725 may further be transmitted or received over a network 720 via the network interface device 708.

While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "sending," "receiving," "routing," "updating," "providing," "generating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 25 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the disclosure is not to be limited to the details given herein, but may be modified within the scope and equivalents of the appended claims.

What is claimed is:

1. A method comprising:
receiving a topology definition describing a topology of an event streaming platform;
generating, based on the topology definition, a Directed Acyclical Graph (DAG) that represents a data plane of the event streaming platform; and
generating, by a processing device, a simplified data plane pathway based on the DAG, wherein the simplified data plane pathway reduces intermediate hops between an event source and a final event destination described by the topology definition.

2. The method of claim 1, further comprising generating an event message at the event source and sending the event message directly to the final event destination in a single hop.

3. The method of claim 2, wherein generating the event message comprises generating a hypertext transfer protocol (HTTP) CloudEvent message.

4. The method of claim 1, further comprising receiving the topology definition from a user describing a series of eventing components.

5. The method of claim 1, wherein the event streaming platform is at least partially implemented as a Knative event streaming platform.

6. The method of claim 1, further comprising generating a plurality of data plane pathways which includes the simplified data plane pathway, wherein each ingress service of the topology is associated with one of the plurality of data plane pathways.

7. The method of claim 1, wherein the topology of the event streaming platform comprises an event broker to implement an event filter, and wherein generating the simplified data plane pathway comprises implementing the event filter at the event source.

8. The method of claim 1, further comprising receiving an updated topology definition describing a new topology of the event streaming platform and, responsive to the receiving:
generating, based on the updated topology definition, an updated DAG that represents an updated data plane of the event streaming platform; and
generating a new simplified data plane pathway based on the updated DAG.

9. A system comprising:
a memory; and
a processing device operatively coupled to the memory, the processing device to:
receive a topology definition describing a topology of an event streaming platform;
generate, based on the topology definition, a Directed Acyclical Graph (DAG) that represents a data plane of the event streaming platform; and
generate a simplified data plane pathway based on the DAG, wherein the simplified data plane pathway reduces intermediate hops between an event source and a final event destination described by the topology definition.

10. The system of claim 9, wherein the processing device is further to generate a hypertext transfer protocol (HTTP) CloudEvent message at the event source and send the HTTP CloudEvent message directly to the final event destination in a single hop.

11. The system of claim 9, wherein the processing device is further to receive the topology definition from a user describing a series of eventing components.

12. The system of claim 9, wherein the event streaming platform is at least partially implemented as a Knative event streaming platform.

13. The system of claim 9, wherein the processing device is further to generate a plurality of data plane pathways which includes the simplified data plane pathway, wherein each ingress service of the topology is associated with one of the plurality of data plane pathways.

14. The system of claim 9, wherein the topology of the event streaming platform comprises an event broker to implement an event filter, and wherein to generate the simplified data plane pathway comprises to implement the event filter at the event source.

15. The system of claim 9, wherein the processing device is further to receive an updated topology definition describing a new topology of the event streaming platform and, responsive to the updated topology definition:
generate, based on the updated topology definition, an updated DAG that represents an updated data plane of the event streaming platform; and
generate a new simplified data plane pathway based on the updated DAG.

16. A non-transitory computer-readable medium, having instructions stored thereon which, when executed by a processing device, cause the processing device to:
receive a topology definition describing a topology of an event streaming platform;
generate, based on the topology definition, a Directed Acyclical Graph (DAG) that represents a data plane of the event streaming platform; and
generate, by the processing device, a simplified data plane pathway based on the DAG, wherein the simplified data plane pathway eliminates intermediate hops between an event source and a final event destination described by the topology definition.

17. The non-transitory computer-readable medium of claim 16, further comprising instructions to cause the processing device to generate a hypertext transfer protocol (HTTP) CloudEvent message at the event source and send the HTTP CloudEvent message directly to the final event destination in a single hop.

18. The non-transitory computer-readable medium of claim 16, further comprising instructions to cause the processing device to receive the topology definition from a user describing a series of eventing components.

19. The non-transitory computer-readable medium of claim 16, wherein the event streaming platform is at least partially implemented as a Knative event streaming platform.

20. The non-transitory computer-readable medium of claim 16, wherein the topology of the event streaming platform comprises an event broker configured to implement an event filter, and wherein to generate the simplified data plane pathway comprises to implement the event filter at the event source.

* * * * *